US008958937B2

(12) United States Patent
Hillman, Jr. et al.

(10) Patent No.: US 8,958,937 B2
(45) Date of Patent: Feb. 17, 2015

(54) CLEANING MACHINE WITH COLLISION PREVENTION

(71) Applicant: Intellibot Robotics LLC, Portland, OR (US)

(72) Inventors: Henry L. Hillman, Jr., Vancouver, WA (US); Erick Frack, Portland, OR (US); Daniel M. Daly, Brownsburg, IN (US); David M. Knuth, Jr., East Dubuque, IL (US)

(73) Assignee: Intellibot Robotics LLC, Portland, OR (US)

( * ) Notice: Subject to any disclaimer, the term of this patent is extended or adjusted under 35 U.S.C. 154(b) by 51 days.

(21) Appl. No.: 13/797,065

(22) Filed: Mar. 12, 2013

(65) Prior Publication Data

US 2014/0277868 A1    Sep. 18, 2014

(51) Int. Cl.
    *B60L 15/10*    (2006.01)
    *B60L 15/20*    (2006.01)
    *A47L 11/24*    (2006.01)
    *A47L 11/28*    (2006.01)
    *A47L 11/40*    (2006.01)

(52) U.S. Cl.
    CPC .......... *B60L 15/10* (2013.01); *A47L 11/24* (2013.01); *A47L 11/4011* (2013.01); *A47L 11/28* (2013.01); *B60L 15/20* (2013.01)
    USPC .............................. 701/22; 701/301; 15/340.2

(58) Field of Classification Search
    None
    See application file for complete search history.

(56) References Cited

U.S. PATENT DOCUMENTS

| 5,044,043 | A  | * | 9/1991 | Basham et al. ............... 15/319 |
|---|---|---|---|---|
| 5,251,680 | A  | * | 10/1993 | Minezawa et al. ........... 180/169 |
| 6,124,694 | A  |   | 9/2000 | Bancroft et al. |
| 6,523,912 | B1 | * | 2/2003 | Bond et al. ....................... 303/9 |
| 2009/0020356 | A1 | * | 1/2009 | Mayer et al. ................... 180/446 |
| 2011/0313604 | A1 | * | 12/2011 | Kume et al. ..................... 701/22 |
| 2012/0221174 | A1 |   | 8/2012 | Daly |

FOREIGN PATENT DOCUMENTS

DE          19615712      * 12/1997
DE     102005027183 A1  * 12/2006

OTHER PUBLICATIONS

Robotics: Science and Systems I, Lab 6; Local Navigation and Error Analysis, Massachusetts Institute of Technology, 2009.
Wall Detection A Sonic Sojourn, Carnegie Mellon Robotics Academy, printed from Internet, http://www.education.rec.ri.cmu.edu/previews/robot_c_products/teaching_rc_tetrix_preview/sensing/wallsonar/documents/Sensing_wallsonar.html.

* cited by examiner

*Primary Examiner* — Michael J Zanelli
(74) *Attorney, Agent, or Firm* — Fox Rothschild LLP

(57) ABSTRACT

A floor cleaning machine includes a set of obstacle sensors that detect when the machine is approaching an obstacle. If the obstacle is less than a threshold distance away from the machine, the machine may output an alert and override the operator's command with a command to reduce the speed of the machine. If the obstacle is less than a minimum threshold distance away from the machine, the machine may come to a complete stop to prevent the collision.

18 Claims, 3 Drawing Sheets

CLEANING MACHINE WITH COLLISION PREVENTION

BACKGROUND

A significant number of floor care machines are damaged due to collisions with walls, doors and other obstacles. Many of these collisions are caused by inexperienced or careless human operators who use the machines to push open doors, or who may move the machine too quickly and are unable to slow the machine down before a collision occurs.

This document describes methods and systems that can help solve at least some of the problems described above.

SUMMARY

In an embodiment, a floor cleaning machine that operates in a manually-operated mode includes a motor that drives one or more drive wheels. The machine also includes a processor and a controller that operates the motor. A set of obstacle sensors may detect when the machine is approaching an obstacle. If the obstacle is within a range of the sensors, or less than a threshold distance away from the machine, the machine may output an alert. The alert may serve to make the machine's operator aware of the obstacle, or it may alert the obstacle that the machine is about to reduce speed or stop because of the obstacle. The machine may then override the operator's drive command and instead issue a command to reduce the speed of the machine. If the obstacle is less than a minimum threshold distance away from the machine, the machine may come to a complete stop to prevent the collision.

Optionally, the system may determine a distance between the object and the machine; use the distance in the determination of whether the machine is expected to collide with the object; and generate the instructions to override the operator command and reduce the speed only of the processor determines that the machine is expected to collide with the object in less than a threshold time period.

Also, in some embodiments, the system may determine whether the object is within a threshold distance away from the machine in the direction of movement; and if so output an alert to an operator of the machine. In addition, the system may output an alert indicating that the operator command is being overridden and the speed of the machine is being reduced.

In various embodiments, reducing the speed may include determining a new maximum safe speed and casing the controller to implement the new maximum safe speed. If the object is within a threshold distance of the machine, the system may set the maximum safe speed to zero, apply a brake, or both.

In another embodiment, a floor cleaning machine includes a drive wheel and a motor that, in operation, causes the drive wheel to turn. The machine also includes a processor and a speed controller that controls the motor. An obstacle sensor may detect when the machine is approaching an obstacle, and one or more motion sensors may detect a speed and a direction of movement of the machine. A memory may contain programming instructions that are configured to instruct the processor to receive an operator command to drive the machine; receive, from the obstacle sensor, data representative of an object within a range of the sensor; determine that the direction of movement of the machine is consistent with a direction of the obstacle sensor; and in response to determining that the direction of movement of the machine is consistent with the direction of the obstacle sensor and receiving the data representative of the object, implement a collision prevention sequence. The collision prevention sequence may include generating an alert; determining a maximum speed for the machine; and issuing a command to a drive controller to override the operator command and reduce a speed of the machine to the determined maximum speed.

In another embodiment, in a method of operating a floor cleaning machine, a processor of the machine may receive an operator command to drive the machine, and also receive obstacle sensor data representative of an object within a range of the sensor. If the processor receives the obstacle sensor data and determines that a direction of movement of the machine is consistent with a direction of the obstacle sensor, then in response it may generate an alert, determine a maximum speed for the machine, and issue a command to a drive controller to override the operator command and reduce a speed of the machine to the determined maximum speed.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

Figure 1:
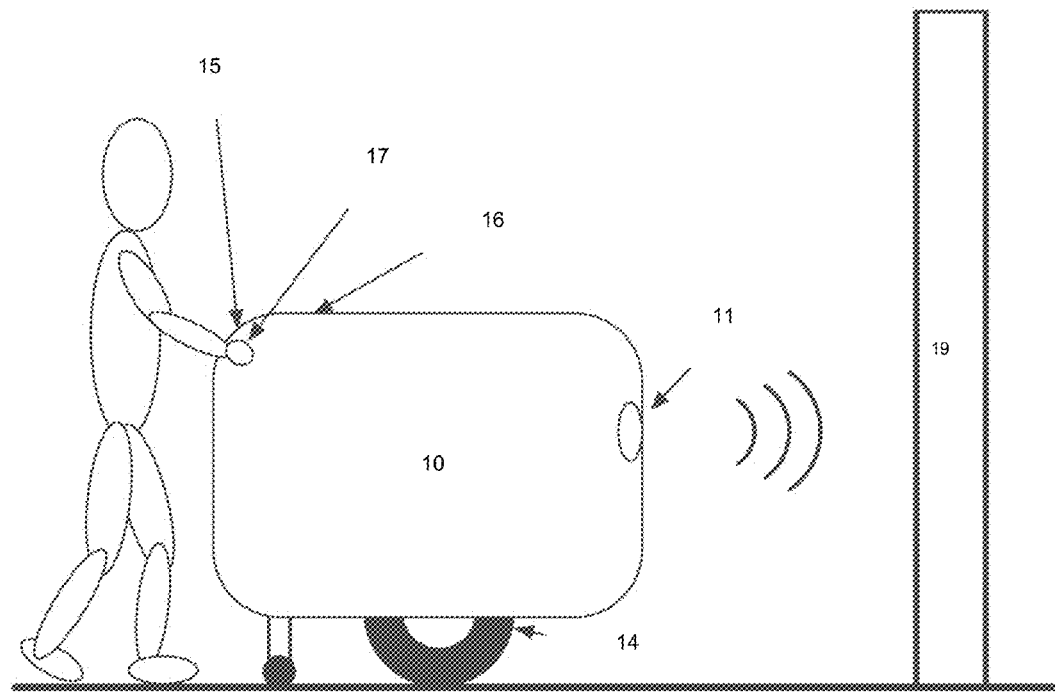
FIG. 1 illustrates an example of a floor cleaning machine in operation.

FIG. 1 illustrates an example of a floor cleaning machine 10 in operation. As shown in FIG. 1, the floor cleaning machine is manually operated, but it may include motorized features to aid in navigation. For example, the floor cleaning machine 10 may include one or more drive wheels 14 that are driven by an internal motorized system to help the operator move the machine throughout an area to be cleaned. The drive wheel or wheels 14 may be traditional wheels as shown, or the drive wheels may include other structures that can be moved in response to a motorized and/or manual force, such as rollers, casters, one or more continuous tracks or similar structures.

The machine may include one or more handles 17 that the operator may grasp to help control the direction of the vehicle. The machine also may include a user interface 15 such as a touch screen, keypad and display, and/or audio input and/or output via which the user may input commands to and/or receive status information for the machine. The machine may include one more obstacle sensors 11 to detect encroaching obstacles 19 such as walls, doors, furniture and the like. The machine also may include one or more alarms 16 such as an audio output, light, or other audio or visual presentation system that may be activated when the sensors 11 detect that the machine is approaching an obstacle 19. The alarm(s) 16 may be integrated with one or more other elements of the machine, such as the user interface 15. Alternatively, any of the alarm(s) 16 may operate as independent devices that are included with the machine.

The cleaning machine 10 will also include various additional components (not shown) that enable it to function as a floor cleaning machine. Such components may include a vacuum; one or more brushes or other sweeping/scrubbing tools; one or more tanks for holding fluids such as water, soap, cleaning solution, and or suctioned fluid; a nozzle for dispensing water, soap and/or cleaning solution; a suction intake for drawing fluids into the machine; a power source such as a battery, power cord and/or other power device. Additional examples of floor cleaning device elements are shown in FIG. 1 and the accompanying text of U.S. Pat. No. 6,124,694 to Bancroft et al, the disclosure of which is incorporated by reference in its entirety.

Figure 2:
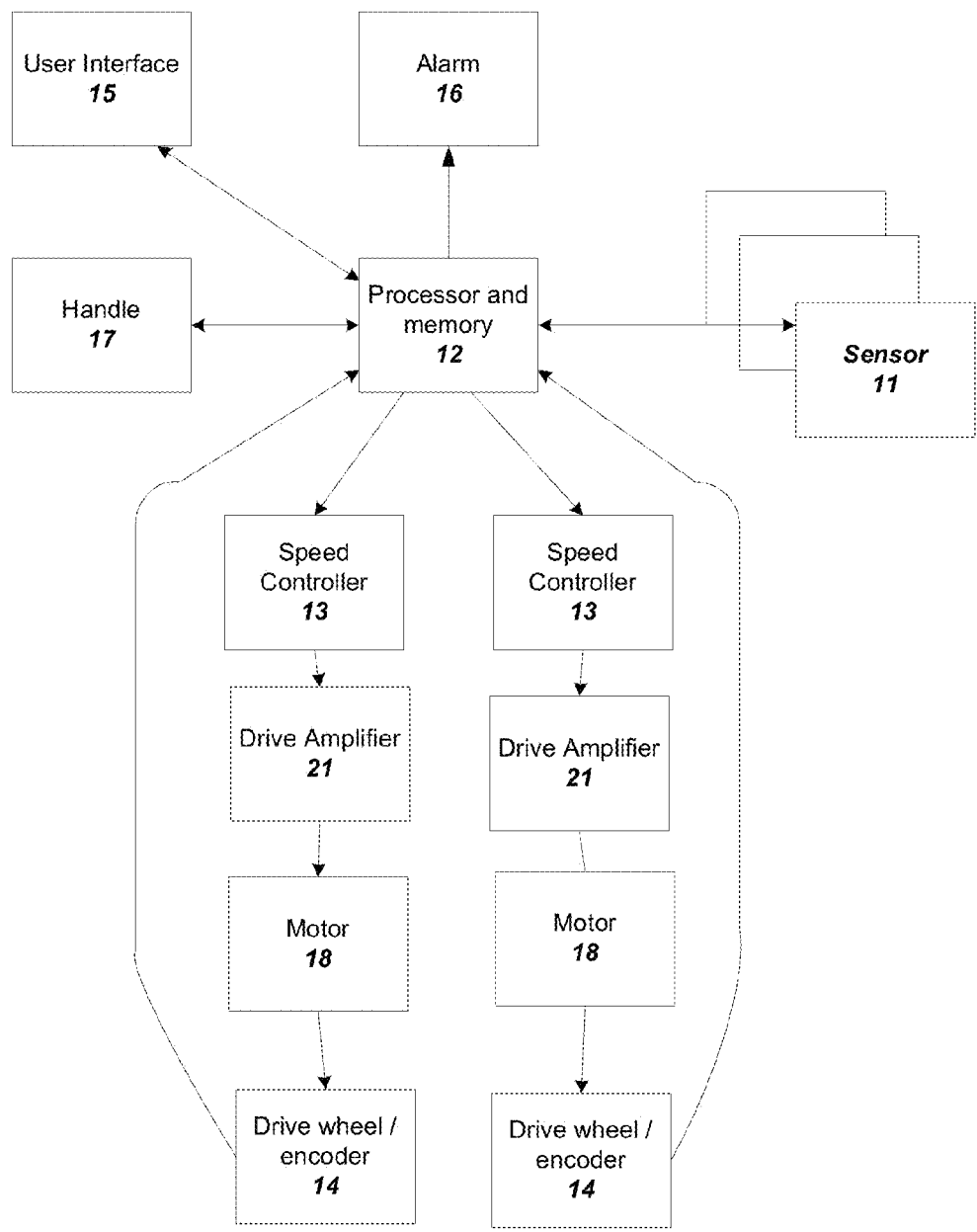
FIG. 2 is a block diagram of various internal elements of a floor cleaning machine with collision prevention capability.

FIG. 2 illustrates various components of the floor cleaning machine of FIG. 1, including various internal drive and control components. In addition to the sensor(s) 11, drive wheel (s) 14, user interface 15, handle 17 and alarm 16, FIG. 2 also shows that the cleaning machine may include an onboard computing device having a processor and optional computer-readable memory 12. The memory (or internal circuitry) may contain programming instructions that, when implemented by the processor, case the device to take various actions. The actions may include receiving data from the sensor(s) 11, sending activation commands to the alarm 16, and generating output to and receiving input from the user interface 15. Optionally, the handle 17 may include one or more features that receive user commands, such as a button that engages the motors to drive the drive wheels, a turnable element for steering the machine, and a speed control input.

When the processor 12 receives commands from the user interface 15 and/or handle 17, it may send a command to the speed controller(s) 13 to operate the motor(s) 18 at a speed that drives the drive wheel(s) 14. The speed may be selected by the user, it may be a default or pre-programmed speed, or it may be a speed that is selected by the user but limited by one or more rules such as a maximum speed. The system shown in FIG. 2 includes two speed controllers 13, motors 18 and drive wheels 14, but in fact any number of such items may be used. In addition, in some embodiments one speed controller 13 may direct more than one motor 18, and one motor 18 may drive more than one drive wheel 14.

The obstacle sensors are sensors that are capable of detecting the presence or one or more obstacles without contacting the obstacles within a range that is a function of the sensor's sensitivity. The sensors may include, for example, ultrasonic sonar systems, vision systems, laser range finders, structured light sensors, and other sensors. Examples of sonar systems are disclosed in U.S. patent application Ser. No. 13/341,386 (titled "Long-Range Sonar") and Ser. No. 13/341,321 (titled "Short-Range Sonar"), the disclosures of which are entirely incorporated herein by reference. For example, an ultrasonic sensor may send a sound wave, and when it detects a reflected wave being returned from the obstacle, the sensor (or a processor connected to the sensor) will calculate the difference between the time that the sensor sent the wave and the time that the sensor received the sound wave. Because the waves will travel at a known speed, the sensor can determine the distance between the sensor and the obstacle.

The sensors 11 provide distance information of the environment. In some embodiment, the sensors will automatically and periodically collect data and return it to the processor at periodic intervals, such as two times per second. Multiple sensors may be available, each of which covers a particular zone around the machine. For example, multiple sensors may be pointed forward, the predominant direction of the machine's motion, to detect obstacles in front of the machine. Side-facing sensors may be used to detect obstacles in case the user causes the device to turn to the right or left.

When a sensor 11 detects an obstacle, it may save or cause the processor to save this data into a memory as an obstacle map grid. The obstacle map grid represents the two-dimensional space around the machine, front, left, right, and behind. For example, the grid is comprised of a set of 128 mm×128 mm cells around the machine. Each cell may be given a weight or score, such as a weight of zero representing no detected obstacle in the location corresponding to the cell. If a sensor reports an obstacle, the corresponding cell's weight may be increased. When there is a non-zero weight in a cell, this indicates to the machine that there is an obstacle near the machine at the location corresponding to the cell. The obstacle map decays weights down to zero at a pace over a few seconds. If a sensor detects an obstacle one time only, the obstacle's map weight in a corresponding may be increased, but then the weight may decay to 0 shortly. If, however, there are multiple detections of the obstacle by the sensor or from multiple sensors (even different modalities of sensors), the obstacle map cell's weight may increase faster than it can decay out and the machine will respond by acknowledging that there is actually an obstacle detected and not just there a phantom erroneous detection. The cells in the obstacle map that have nonzero values may used to determine if the obstacle is in the path of the machine.

The drive subsystem, which may include one or more speed controllers 13 and motors 18, may use optical encoders on the motor shaft to send feedback to the processor 12 and the speed controllers 13 such that the machine can process that data and determine the position, speed, and acceleration of the machine.

The operator may have control of the speed and direction of the machine by setting the speed on the user interface 15 and/or by activating a switch on the handlebar 17 to engage the drive motors. The processor 12 uses the input from the user interface to compute an appropriate control signal to the speed controllers 13, causing the drive motors 14 to spin at a specific rate as determined by the controllers 13. Each drive wheel 14 may be mechanically coupled to its drive motor 18 so that the motor(s) and wheel(s) may propel the machine forward.

The speed controllers may include, or they may send control signals to, one or more drive amplifiers that provide closed-loop velocity control of each drive wheel via regulating the amount of power delivered to the motors. The processor may determine a maximum speed that the drive amplifiers may power the drive motors, or the drive amplifiers may be subject to a built-in (e.g., pre-programmed) speed limitation. When the sensors detect an obstacle in the path of the robot, the machine's software will cause the processor to calculates the distance required to stop, given the current forward speed and a maximum allowable deceleration. The machine may generate visual and/or audible alerts, and the processor may takes control of motion away from the operator at a point in time where deceleration to a stop before collision is possible.

Optical encoders on the drive wheels may provide the closed loop feedback for the drive amplifiers and also serve as sensors to provide the software with the distance the robot travelled. In some embodiments, due to the power capabilities provided by the drive amplifiers and a large (e.g., 18:1) gear ratio between the drive motors and the wheels, it may be nearly impossible for a typical human to push the machine past the maximum speed allowed by the drive amplifiers. Therefore, additional braking may not be required. However, the drive motors and/or drive wheels also may be equipped have an electromechanical brake that stops all motion when applied. The brake need not allow for varied degrees of braking; it can be either applied or disengaged. For example, the brake may be applied if the trajectory and speed of the machine is such that the machine will not stop in time to avoid a collision unless the brake is applied.

When the obstacle map is clear, the maximum allowable speed of the machine may be returned to control of the operator.

In some embodiments, the system may use short range sensors (e.g., sensors having a range of approximately 2.5 meters or less, 1.5 meters or less, 1 meter or less, or other short ranges). If one or more of the sensors detect an obstacle in the path of the machine, the processor may cause the alarm to output an alert, such as an alarm sound or flashing light. The processor also may issue a command to the speed controllers to reduce the speed of the drive motors, thus slowing down the machine. With the short range sensors, the alert may alert the operator that the processor is taking over control of the machine and/or reducing its speed.

In some embodiments, such as those with longer range sensors, if one or more of the sensors detect an obstacle in the path of the machine, the processor may determine a distance of the obstacle from the machine. Based on the machine's current motion data (speed, acceleration, and/or direction of motion) the processor may determine whether the machine will collide with the obstacle if the current motion data remains the same. If so, the machine may generate an alert, the combination of the audible alert, visual alert, and change in speed may alert the operator to slow down. The operator may manually slow the machine down, or allow the computer to do it for him/her. Once the machine is slowed to the safe speed as determined by the processor, the audible and visual alerts may cease. If the operator fails to slow the machine within a specified period of time, or if the operator fails to slow the machine before it reaches a closer range to the object, the processor also may issue a command to the speed controllers to override the operator's command and reduce the speed of the drive motors, thus slowing down the machine.

Figure 3:
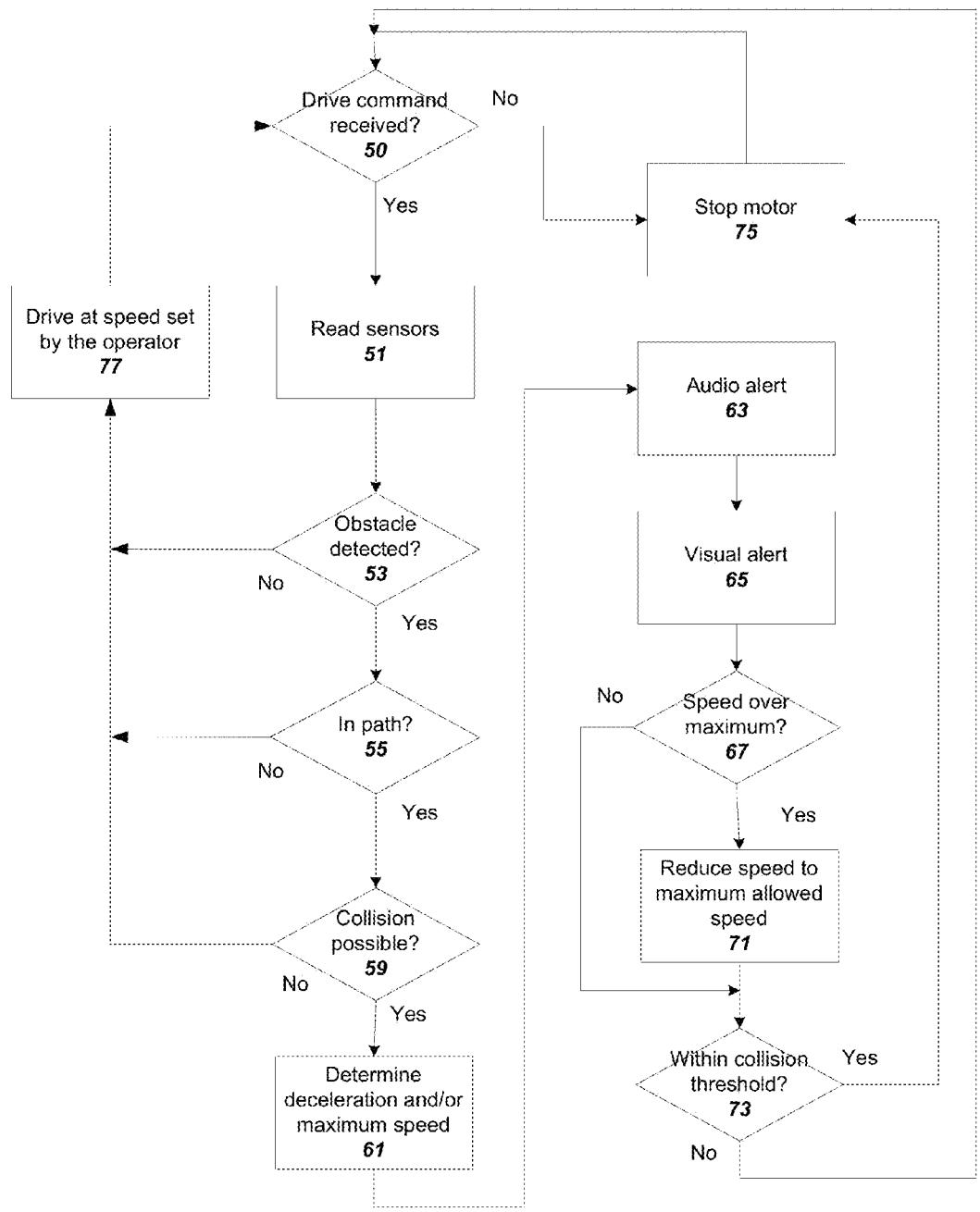
FIG. 3 is a flowchart illustrating a process of operating a floor cleaning machine with collision prevention capability.

FIG. 3 is a flowchart illustrating a process of operating a floor cleaning machine with collision prevention. While the machine is being operated to clean a floor such as by receiving a drive command 50 via the user interface and/or handle controls, the processor will receive information from the obstacle sensor(s) 51. The information may include distance to an obstacle, direction of obstacle relative to the sensor, and/or other data. If the system detects an obstacle 53, it also may receive data from the motor, drive wheel, a gyroscope or other devices that indicates the machine's direction of movement, and it will compare the direction of machine movement to the direction of the obstacle to determine whether the obstacle is in the machine's path of travel 55 within a range of the sensors.

If the obstacle is not in the machine's path, it will continue operation in accordance with the operator's commands, at a speed set by the operator 77 (subject to any inherent limitations of the machine, such as a maximum available speed). However if the obstacle is in the machine's path of travel, the system may take various actions as described below.

In some embodiments, if the distance between the machine and the obstacle is equal to or less than a threshold distance the system may generate an audio alert 63 and/or visual alert 65. In other embodiments, such as those with short range sensors, the system may generate the audio alert 63 and/or visual alert 65 if the obstacle is determined to be within the machine's path regardless of distance. The audio alert may be any suitable alarm such as a buzzer, chime, siren, horn, recorded or synthesized speech or other alert. The visual alert may be a flashing light, a warning sign, and/or any other suitable visual alarm. The alert may indicate that the object is nearby, or it may serve as an alert that the machine is taking control of its speed away from the operator and that it will reduce speed to a maximum safe speed as described below. Different alerts may be provided for each of the two options above.

Before or after the machine issues an alert, the system may determine a deceleration amount and/or a maximum speed for the machine 61 based on the presence of the object and optionally its distance and the machine's current speed. The system also may determine whether the machine's speed is over the maximum safe speed 67. If the speed is over the maximum the processor may generate a command to reduce the drive speed of the motor(s) 71 based on the determined deceleration amount and/or maximum speed. In some embodiments, the maximum safe speed may be zero, depending on the distance between the object and the machine. If the operator releases his or her command to drive the device, the machine's drive motor(s) will stop 75. However, if the operator continues to drive the machine despite the alerts 65, then the processor may override the operator's commands by slowing or stopping as described above.

In some embodiments, the system may use current speed information for the machine to determine a time that the machine will collide with the object at its current speed, and whether a collision is likely because that time is below a threshold 59. If no collision is imminent, then the system may continue operating without an alert or change of speed. This option may be used, for example, in devices with longer-range (2.5 meters or greater) sensors, although it is not limited to such embodiments. In some embodiments the system will only generate the alerts if the time is less than a threshold period of time, in order to avoid generating alerts for objects that are a safe distance away from the device. In some embodiments, the alerts may change as distance between the machine and the object becomes shorter. For example if the distance between the machine and the object is less than a first threshold, an alert light may flash at a first speed. The flash speed may increase when the distance is less than a second (smaller) threshold, and the audio alert may be triggered when the distance is less than a third (even smaller than the second) threshold.

The visual and audio alerts may appear to alert the operator that the speed is being decreased by the computer due to an impending collision. In embodiments with short range sensors, or when the object is very close to the machine, the time available to reduce the speed may be so short that the process occurs almost instantaneously. As an example, to determine the maximum safe speed, upon detecting an object in a pre-defined close range (such as a range of a short range sensor), the maximum speed may be immediately dropped to 400 mm/s, which is the same speed the machine travels under robotic control. For the machine to actually slow down from its current speed to 400 mm/s will take a finite amount of time due to the inertia of the machine and the maximum deceleration that the computer applies to the drive control software, which is 850 mm/s$^2$.

In addition, or alternatively, if the machine is equipped with a separate braking apparatus, the processor may issue a command to apply a brake to the drive wheels to reduce their speed. If the operator continues to command the device to move and the machine becomes so close to the object that the machine and the object are within a maximum safe distance away from each other (i.e., a collision threshold) 73, then the processor may generate a command to stop the drive motor(s) 75, and optionally to also apply a brake.

The system described above describes a manually-operated machine in which the operator issues commands to cause the motor to cause the drive wheels to turn. In some embodiments, the system may be implemented in an automated (robotic) cleaning machine, or in a hybrid machine that is capable of operating in both automated and manual modes.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A floor cleaning machine, comprising:
   a drive wheel;
   a motor that, in operation, causes the drive wheel to turn;
   a speed controller that controls the motor;
   one or more motion sensors that, in operation, detect a speed and a direction of movement of the machine;
   one or more obstacle sensors that, in operation, detect data representative of an object that is external to the machine;
   a processor, communicatively coupled to the speed controller and the sensors; and
   a memory containing programming instructions that are configured to instruct the processor to:
      receive an operator command to drive the machine;
      receive the speed and direction of movement of the machine;
      receive the data representative of the object;
      determine a distance between the object and the machine;
      use the speed, direction of movement and distance to determine whether the machine is expected to collide with the object and whether the machine is expected to collide with the object in less than a threshold time period; and
      in response to determining that the machine is expected to collide with the object in less than the threshold time period, generate one or more instructions to override the operator command and reduce the speed of the machine.

2. The floor cleaning machine of claim 1, wherein the programming instructions are also configured to instruct the processor to:
   determine whether the object is within a threshold distance away from the machine in the direction of movement; and
   if the object is within the threshold distance away from the machine in the direction of movement, output an alert to an operator of the machine.

3. The floor cleaning machine of claim 1, wherein the programming instructions are also configured to instruct the processor to output an alert indicating that the operator command is being overridden and the speed of the machine is being reduced.

4. The floor cleaning machine of claim 1, wherein:
   the programming instructions also comprise determining a maximum safe speed; and
   the programming instructions that instruct the processor to issue a command to reduce the speed of the machine are configured to implement the maximum safe speed.

5. The floor cleaning machine of claim 1, wherein:
   the programming instructions also comprise instructions to determine a new maximum speed; and
   the programming instructions that instruct the processor to determine whether the machine is expected to collide with the object in less than the threshold time period comprise instructions to determine whether the speed of the machine exceeds the maximum speed, and if so the programming instructions that are configured to issue a command to reduce the speed of the machine will implement the maximum speed.

6. The floor cleaning machine of claim 1, wherein the programming instructions that are configured to instruct the processor to issue the command to reduce the speed of the machine comprise instructions to cause the controller to reduce the speed of the motor so that a speed of rotation of the drive wheel is reduced.

7. The floor cleaning machine of claim 1:
   further comprising a brake; and
   wherein the programming instructions that are configured to instruct the processor to issue the command to reduce the speed of the machine comprise instructions to cause the controller to apply the brake so that a speed of rotation of the drive wheel is reduced.

8. A floor cleaning machine, comprising:
   a drive wheel;
   a motor that, in operation, causes the drive wheel to turn;
   a speed controller that controls the motor;
   one or more motion sensors that, in operation, detect a speed and a direction of movement of the machine;
   an obstacle sensor that, in operation, detects data representative of an object that is external to the machine;
   a processor, communicatively coupled to the speed controller and the sensors; and
   a memory containing programming instructions that are configured to instruct the processor to:
      receive an operator command to drive the machine;
      receive, from the obstacle sensor, data representative of an object within a range of the sensor;
      determine that the direction of movement of the machine is consistent with a direction of the obstacle sensor;
      in response to determining that the direction of movement of the machine is consistent with the direction of the obstacle sensor and receiving the data representative of the object:
         generating an alert;
         determining a maximum speed for the machine; and
         issuing a command to the speed controller to override the operator command and reduce a speed of the machine to the determined maximum speed.

9. The floor cleaning machine of claim 8, wherein:
   the programming instructions are also configured to instruct the processor to determine whether the object is within a threshold distance away from the machine; and
   only issue the command to the speed controller to override the operator command if the object is within the threshold distance away from the machine.

10. The floor cleaning machine of claim 8, wherein the programming instructions that instruct the processor to issue the command to reduce the speed of the machine comprise instructions to cause the speed controller to reduce the speed of the motor so that a speed of rotation of the drive wheel is reduced.

11. The floor cleaning machine of claim 8:
    further comprising a brake; and
    wherein the programming instructions that instruct the processor to issue a command to reduce the speed of the machine comprise instructions to apply the brake so that a speed of rotation of the drive wheel is reduced.

12. The floor cleaning machine of claim 8, wherein the programming instructions are also configured to instruct the processor to:
    determine whether a distance from the machine to the obstacle is less than a collision threshold; and
    if so, set the maximum speed to zero.

13. The floor cleaning machine of claim 8:
   further comprising a brake; and
   wherein the programming instructions are also configured to instruct the processor to determine whether a distance from the machine to the obstacle is less than a collision threshold and if so, generate a command to apply the brake to stop rotation of the drive wheel.

14. A method of operating a floor cleaning machine, comprising, by a processor of the machine:
   receiving an operator command to drive the machine;
   receive, from an obstacle sensor of the machine, data representative of an object within a range of the sensor;
   determining that a direction of movement of the machine is consistent with a direction of the obstacle sensor;
   in response to receiving the data representative of the object and determining that the direction of movement of the machine is consistent with the direction of the obstacle sensor:
      generating an alert;
      determining a maximum speed for the machine; and
      issuing a command to a drive controller to override the operator command and reduce a speed of the machine to the determined maximum speed.

15. The method of claim 14, further comprising, by the processor:
   determining a distance between the object and the machine; and
   using the distance in the determination of the maximum speed.

16. The method of claim 14, further comprising:
   determining that the distance is less than a collision threshold; and
   in response to determining that the distance is less than the collision threshold, setting the maximum speed to zero.

17. The method of claim 14, further comprising:
   in response to determining that the distance is less than the collision threshold, applying a brake to a motor or drive wheel of the machine.

18. The method of claim 14, wherein issuing the command to reduce the speed of the machine comprises causing the drive controller to reduce the speed of a motor so that a speed of rotation of a drive wheel is reduced.

* * * * *